United States Patent
Ruse et al.

(10) Patent No.: US 7,436,082 B2
(45) Date of Patent: Oct. 14, 2008

(54) ROCKING MOTION CHARGING DEVICE USING FARADAY PRINCIPLE

(75) Inventors: Martin D. Ruse, Gloucester, MA (US); Kenneth J. LeBlanc, Gloucester, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/698,263

(22) Filed: Jan. 24, 2007

(65) Prior Publication Data

US 2008/0174118 A1    Jul. 24, 2008

(51) Int. Cl.
*F03B 13/10* (2006.01)
*F03B 13/12* (2006.01)
*H02P 9/04* (2006.01)

(52) U.S. Cl. .......................................... 290/42; 290/53
(58) Field of Classification Search ................... 290/42, 290/43, 53, 54; 60/398, 498, 501, 497, 496; 416/85; 415/7
See application file for complete search history.

(56) References Cited

U.S. PATENT DOCUMENTS

| | | | | | |
|---|---|---|---|---|---|
| 472,398 | A | * | 4/1892 | Rosenholz | 290/53 |
| 937,712 | A | * | 10/1909 | McFarland | 60/325 |
| 3,204,110 | A | * | 8/1965 | Masuda | 290/42 |
| 3,231,749 | A | * | 1/1966 | Hinck, III | 290/53 |
| 3,696,251 | A | * | 10/1972 | Last et al. | 290/53 |
| 3,758,788 | A | * | 9/1973 | Richeson | 290/42 |
| 3,783,302 | A | * | 1/1974 | Woodbridge | 290/42 |
| 4,110,630 | A | * | 8/1978 | Hendel | 290/53 |
| 4,207,739 | A | * | 6/1980 | Scarpi | 60/398 |
| 4,210,821 | A | * | 7/1980 | Cockerell | 290/53 |
| 4,266,143 | A | * | 5/1981 | Ng | 290/53 |
| 4,352,023 | A | * | 9/1982 | Sachs et al. | 290/42 |
| 4,363,213 | A | * | 12/1982 | Paleologos | 60/505 |
| 4,389,843 | A | * | 6/1983 | Lamberti | 60/507 |
| 4,423,334 | A | * | 12/1983 | Jacobi et al. | 290/53 |
| 4,531,063 | A | * | 7/1985 | Vielmo et al. | 290/53 |
| 4,718,231 | A | * | 1/1988 | Vides | 60/398 |
| 4,851,704 | A | * | 7/1989 | Rubi | 290/53 |

(Continued)

FOREIGN PATENT DOCUMENTS

GB    1594585    11/1977

(Continued)

OTHER PUBLICATIONS

English Language Abstract of WO/02/061277.

*Primary Examiner*—Julio Gonzalez

(57) ABSTRACT

The present invention provides rocking motion charging device using Faraday's principle. The rocking motion charging device features at least three rocking devices for generating electricity and a gimbaled disk or member coupled to the at least three rocking devices, responsive to a rocking motion, for moving in two dimensions to generate the electricity. The at least three rocking devices may include pivots, linkage or both for pivotally coupling to the gimbaled disk or member; include magnets that pass through stationary coils due to the rocking motion of the gimbaled disk or member and generate electricity due to Faraday's principle; include four rocking devices that are equi-spaced with respect to one another; include one or more devices to store the electricity, including batteries or capacitors; or some combination thereof. The two dimensions include movement both forwards and backwards and side-to-side, including movement caused by the rocking motion of a marine vessel.

8 Claims, 1 Drawing Sheet

U.S. PATENT DOCUMENTS

| | | | |
|---|---|---|---|
| 5,696,413 A * | 12/1997 | Woodbridge et al. | 310/15 |
| 5,909,060 A * | 6/1999 | Gardner | 290/53 |
| 5,945,762 A | 8/1999 | Chen et al. | |
| 6,020,653 A | 2/2000 | Woodbridge et al. | |
| 6,791,206 B1 | 9/2004 | Woodbridge | |
| 6,820,846 B2 | 11/2004 | Knoski | |
| 7,239,038 B1 * | 7/2007 | Zimmerman et al. | 290/54 |
| 2005/0099010 A1 * | 5/2005 | Hirsch | 290/42 |
| 2006/0048510 A1 | 3/2006 | White et al. | |

FOREIGN PATENT DOCUMENTS

| | | |
|---|---|---|
| GB | 2001137 | 7/1978 |
| GB | 2001137 A * | 1/1979 |
| GB | 2041095 | 12/1979 |
| WO | 02061277 | 8/2002 |

\* cited by examiner

ROCKING MOTION CHARGING DEVICE USING FARADAY PRINCIPLE

BACKGROUND OF THE INVENTION

1. Field of the Invention

The present invention relates to a rocking motion charging device; and more particularly to a rocking motion charging device using the Faraday principle for generating electricity in a boat or other rocking apparatus.

2. Brief Description of Related Art

Rocking devices for generating electricity are known in the art, but will merely work in a one dimensional rocking direction, i.e. up or down. For example, U.S. Pat. No. 5,696,413 discloses a rocker arm or float that rocks in response to swell and drives magnet/coil interaction to generate electricity. The rocker arm or float only rocks in one dimension, i.e. up and down.

Other known devices and their shortcomings include the following:

U.S. Pat. No. 6,820,846 discloses a multiple ball joint gimbal that has a mount and linear actuators (electromagnetic rings). In operation, electric power is used to move the mount.

U.S. Pat. No. 4,423,334 discloses a buoy, a housing and a support platform including a pendulum arm having an arcuate bob weight with two windings (unlabelled) arranged thereon and coupled to an electrical circuit for storing electrical energy, and also including two magnets. In response to rocking motion of the buoy, the arcuate bob weight swings and the two windings and magnets cooperate to generate the electricity. The arcuate bob weight swings in one dimension, i.e. either back and forth or side-to-side.

U.S. Pat. No. 5,945,762 discloses a movable magnetic transmitter for inducing electrical current in an implanted coil that is very different from your invention, which includes an external power head having a motor drive coupled to a rotating magnet for coordinating the movement of an implanted receiver coil.

U.S. Pat. No. 6,020,653 discloses a submerged reciprocating electrical generator that is very different from your invention, including a float, a cable, a coil support tube, a magnetic core and a coil. In response to movement of the float, the magnetic core and coil cooperate to generate the electricity.

See also U.S. Pat. No. 6,791,206 and publication no. 2006/0048510.

Based on an understanding and appreciation of the known prior art discussed above, there is a need in the industry for a more effective technique of using Faraday's principle for generating electricity in a boat or other rocking apparatus. The new technique enables forwards and backwards as well as side to side rocking motion as experienced in a typical maritime vessel.

SUMMARY OF THE INVENTION

The present invention provides a new and unique rocking motion charging device using the Faraday principle. The rocking motion charging device features at least three rocking devices for generating electricity; and a gimbaled disk or member coupled to the at least three rocking devices, responsive to a rocking motion, for moving in two dimensions to generate the electricity.

The at least three rocking devices may include pivots, linkage or both for pivotally coupling to the gimbaled disk or member; include magnets that pass through stationary coils due to the rocking motion of the gimbaled disk or member and generate electricity due to the Faraday principle; include four rocking devices that are equi-spaced with respect to one another; include one or more devices to store the electricity, including batteries or capacitors; or some combination thereof.

The two dimensions include movement both forwards and backwards and side-to-side, including movement caused by the rocking motion of a marine vessel.

In one particular embodiment, the gimballed disk may take the form of a disk such as that used in compasses which stays level at all times and is connected to four powerful magnets equi-spaced with the pivots and links. These magnets will pass through the stationary coils due to the rocking motion and generated electricity due to the Faraday principle.

DETAILED DESCRIPTION OF THE INVENTION

Figure 1:
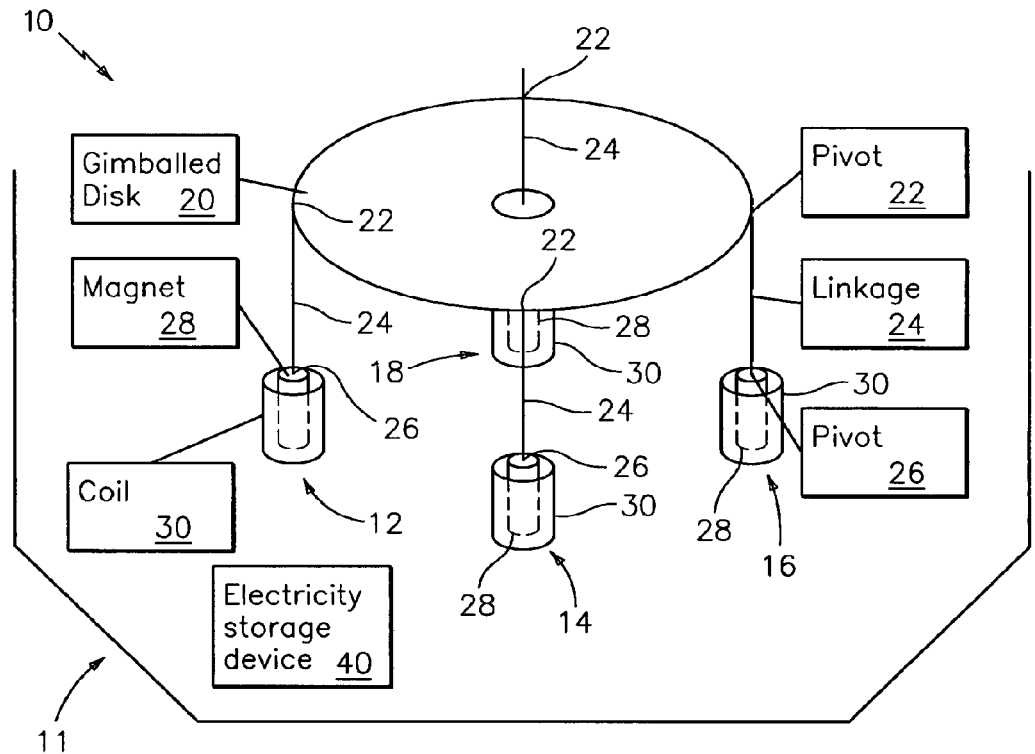
FIG. 1 is a block diagram of a rocking motion charging device using Faraday's principle for generating electricity in a boat or other rocking apparatus or system according to the present invention.

FIG. 1 shows a rocking motion charging device generally indicated as 10 using Faraday's principle. The rocking motion charging device 10 features at least three rocking devices generally indicated as 12, 14, 16, 18, 20 for generating electricity; and a gimbaled disk or member coupled to the at least three rocking devices 12, 14, 16, 18, 20, responsive to a rocking motion, for moving in two dimensions to generate the electricity. The rocking motion may be caused by the movement of a boat or other rocking apparatus generally indicated 11, although the scope of the invention is not intended to be limited to the same.

The at least three rocking devices 12, 14, 16, 18, 20 may include pivots 22, linkage 24, pivots 26, or some combination thereof, for pivotally coupling to the gimbaled disk or member 20 to the magnets 28. In operation, the magnets 28 pass through stationary coils 30 due to the rocking motion of the gimbaled disk or member 20 and generate electricity due to Faraday's principle. Such pivots 22, 26, linkage 24, magnets 28 and coils 30 are known in the art, and the scope of the invention is not intended to be limited to any particular type or kind either now known or later developed in the future.

By way of example, the at least three rocking devices 12, 14, 16, 18, 20 include four rocking devices that are equi-spaced with respect to one another, although the scope of the invention is not intended to be limited to any particular spacing between the same. Moreover, the scope of the invention is not intended to be limited to any particular number of rocking devices, as long as there are three or more. For example, embodiments are envisioned using 5, 6, ..., n rocking devices depending on the application.

The rocking motion charging device 10 may also include one or more devices 40 coupled to the coils 30 to store the electricity being generated, including batteries or capacitors, or some combination thereof.

The two dimensions include movement both forwards and backwards and side-to-side, including movement caused by the rocking motion of a marine vessel.

Although not shown, the rocking motion charging device 10 may include a controller or processing module for controlling and/or processing the electricity being generated.

Figure 2:
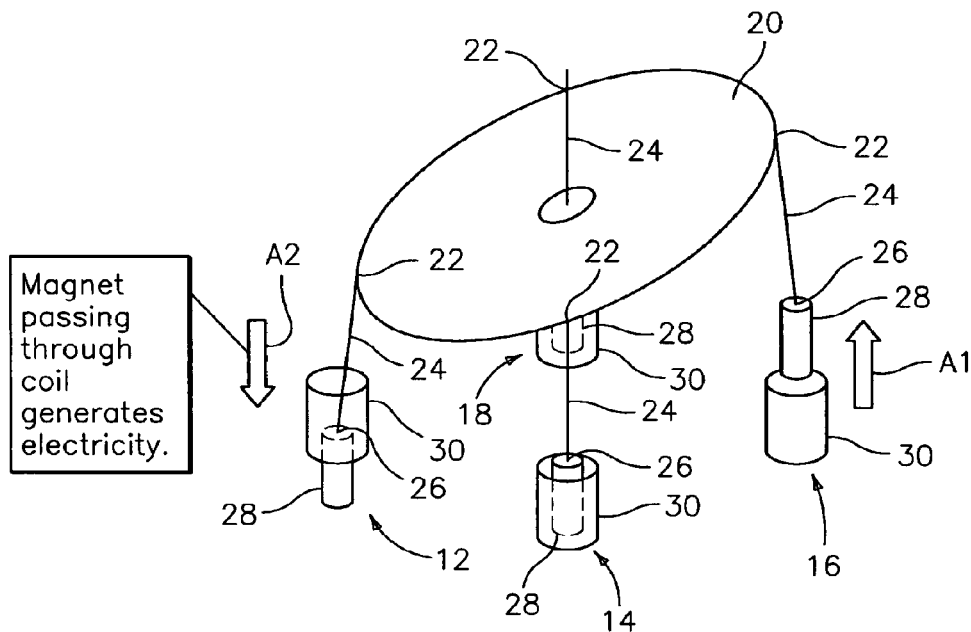
FIG. 2 is a diagram showing the magnet passing through a coil to generate the electricity according to the present invention.

FIG. 2 shows the magnets 28 passing through the coil 30 via the up and down movement as shown by the arrows a1, a2 to generate the electricity according to the present invention.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

We claim:

1. A rocking motion charging device for generating electricity in a rocking device or apparatus, including a marine vessel, comprising:
   at least three rocking devices, each having a magnet and a coil for moving in relation to one another for generating electricity using Faraday's principle; and
   a gimbaled member coupled to the at least three rocking devices, the at least three rocking devices being spaced at different points in relation to one another on the gimbaled member, the gimbaled member being responsive to a rocking motion causing at least two different points on the gimbaled member to move in opposing directions along an axis, for moving at least one magnet or coil of at least one rocking device in relation to one another in one direction substantially along the axis, and for also moving at least another magnet or coil of at least another rocking device in relation to one another in an opposite direction substantially along the same axis so as to generate the electricity.

2. A rocking motion charging device according to claim 1, wherein the at least three rocking devices include pivots, linkage or both for pivotally coupling the magnet and coil to the gimbaled member.

3. A rocking motion charging device according to claim 1, wherein the at least three rocking devices include four rocking devices that are equi-spaced with respect to one another.

4. A rocking motion charging device according to claim 1, wherein the at least three rocking devices include one or more devices to store the electricity, including batteries or capacitors.

5. A rocking device or apparatus, including a marine vessel, having a rocking motion charging device for generating electricity therein, the rocking motion charging device comprising:
   at least three rocking devices, each having a magnet and a coil for moving in relation to one another for generating electricity using Faraday's principle; and
   a gimbaled member coupled to the at least three rocking devices, the at least three rocking devices being spaced at different points in relation to one another, the gimbaled member being responsive to a rocking motion causing at least two different points on the gimbaled member to move in opposing directions along an axis, for moving at least one magnet or coil of at least one rocking device in relation to one another in one direction substantially along the axis, and for also moving at least another magnet or coil of at least another rocking device in relation to one another in an opposite direction substantially along the same axis so as to generate the electricity.

6. A rocking device or apparatus according to claim 5, wherein the at least three rocking devices include pivots, linkage or both for pivotally coupling the magnet and coil to the gimbaled member.

7. A rocking device or apparatus according to claim 5, wherein the at least three rocking devices include four rocking devices that are equi-spaced with respect to one another.

8. A rocking device or apparatus according to claim 5, wherein the at least three rocking devices include one or more devices to store the electricity, including batteries or capacitors.

* * * * *